United States Patent [19]

Godfrey et al.

[11] Patent Number: 4,494,050
[45] Date of Patent: Jan. 15, 1985

[54] SYSTEM FOR SUPRESSION OF UNDERDAMPED OSCILLATIONS IN AC POWER DRAWN BY SYNCHRONOUS MOTORS DRIVING WARD-LEONARD GENERATORS

[75] Inventors: Noel R. Godfrey, Gordon; Larry S. Parkes, Engadine; Richard H. Treacy, Wollstonecraft, all of Australia

[73] Assignee: The Broken Hill Proprietary Company Limited, Australia

[21] Appl. No.: 540,617

[22] Filed: Oct. 11, 1983

[30] Foreign Application Priority Data

Oct. 10, 1982 [AU] Australia .................... PF6343/82

[51] Int. Cl.³ .............................................. H02P 5/24
[52] U.S. Cl. ...................................... 318/158; 318/140; 318/154; 318/156; 318/682
[58] Field of Search ............... 318/140, 141, 142, 145, 318/147, 148, 154, 156, 158, 682

[56] References Cited

U.S. PATENT DOCUMENTS

| | | | |
|---|---|---|---|
| 2,897,427 | 7/1959 | Bradburn | 318/145 |
| 3,108,214 | 10/1963 | Wilkerson | 318/434 |
| 3,242,407 | 3/1966 | Hansen | 318/145 X |
| 3,436,633 | 4/1969 | Hemmenway et al. | 318/158 X |
| 3,532,950 | 10/1970 | Jackson | 318/158 X |
| 3,965,403 | 6/1976 | Okado | 318/154 X |
| 4,031,440 | 6/1977 | Christian et al. | 318/140 X |

*Primary Examiner*—J. V. Truhe
*Assistant Examiner*—Bentsu Ro
*Attorney, Agent, or Firm*—Gerald J. Ferguson, Jr.; Joseph J. Baker

[57] ABSTRACT

A method and apparatus for reducing oscillations in input electrical power to a Ward-Leonard drive system which is subject to variations in mechanical loading, the technique utilizing a notch filter in the feedback path to the dc generator, the notch filter being turned to match the resonant frequency of the synchronous motor.

10 Claims, 12 Drawing Figures

FIG 1

FIG 2A
FREQUENCY DOMAIN

FIG 2B
TIME DOMAIN

SYSTEM FOR SUPRESSION OF UNDERDAMPED OSCILLATIONS IN AC POWER DRAWN BY SYNCHRONOUS MOTORS DRIVING WARD-LEONARD GENERATORS

This invention relates to electric motor control systems and is particularly concerned with systems in which variations in mechanical loads are prone to cause high transient variations on mains supplies.

It is the object of the invention to provide a method and drive system in which the transient oscillations in electrical supply power due to variations in mechanical loading are reduced in magnitude.

According to the present invention there is provided a method of reducing the amplitude of oscillations in input electrical power to a drive system, the system including a synchronous motor the output shaft which is coupled to drive a dc generator which is in turn coupled electrically to a dc motor, the output shaft of which is coupled to a mechanical load, said generator including a generator field exciter, said method including the steps of generating a control signal for controlling said generator field exciter, at least one component of the control signal having been derived from the dc motor and related to its instantaneous power and is passed through a notch filter the frequency response of which is generally provides reciprocal compensation for the frequency response of the ratio of input electrical power to the synchronous motor to the mechanical power on its output shaft, and applying the control signal to said exciter to thereby reduce oscillations in input electrical power to the synchronous motor.

Preferably, the frequency response of the filter network has a notch filter depth which is approximately twice the value of amplification at resonance in the frequency response of the synchronous motor.

The invention also provides an electric drive system comprising a synchronous motor for coupling to an ac mains supply, a dc generator coupled to be driven by the output shaft of the synchronous motor and including a field exciter, a dc motor coupled to be electrically driven by the dc generator and the output shaft of which is coupled in use to a mechanical load, said drive system including control means for controlling power output on said output shaft, said control means including a control circuit for controlling the field exciter of the dc generator, a notch filter the frequency response of which generally provides reciprocal compensation for the frequency response of the ratio of input electrical power to the synchronous motor to the mechanical power on its output shaft, said circuit including means for generating at least one control signal related to the instantaneous power of the of the dc motor, said control signal being coupled to the notch filter and the output thereof being coupled to control the field exciter of the dc generator.

The method and drive system of the invention could be used in a variety of applications but in the remainder of the specification the invention will be described in the context of its use in large capacity draglines used in mining operations but it is to be understood that the principles of the invention would be applicable in other situations where variations in mechanical loading cause unwanted transients in mains supplies.

The synchronous motor, dc generator and dc motor preferably take the form of a so called Ward Leonard generator set and the reduction of oscillations in the mains supply is effected by means of a special feature incorporated into the Ward Leonard dc control system, this feature functioning to attenuate those components of dc motor electrical power whose frequencies fall in the vicinity of the natural frequency of the synchronous motor. Components of load power at other frequencies remain relatively unaffected, so that there is little or no noticeable effect on, or degradation to, the performance of the dc motor drive system.

The invention is effective only for power stimuli which originate from the dc motor system and will not attenuate power oscillations which are stimulated from the power system. Experience has shown that effects of power system influences are insignificant compared to those of the dc drive system. The invention is effective for power stimuli brought about by forces associated with both mechanical load and acceleration of intertias in the dc motor system.

In addition to its main function of producing driving torque to a mechanical load, the synchronous electrical motor has the capability of varying the magnitude of its ac terminal voltage by adjustment of its field excitation. This latter property is used to advantage as a means of controlling load voltage and power factor, especially in applications where variations in the consumed power would otherwise result in undesirable magnitudes of fluctuation in the power supply voltage.

An example application of where the combination of a widely fluctuating load fed from a weak power system tends to the extreme, is a remotely located strip mine operating large dragline excavators. The digging motions of a dragline have traditionally been driven by variable speed dc motors. Technical and economic considerations have favoured the use of Ward Leonard control to effect the required variable speed operation, with the generator sets being driven by ac synchronous motors. In this way, the synchronous motors become the primary consumers of input power, which is transmitted in the form of mechanical shaft torque to the dc generators. Electrical power is further transmitted from the generators to the dc motors, which then convert it to mechanical power for digging, hoisting and slewing. In practice many generators may be driven by the synchronous motor.

Although the use of a synchronous motor has an overriding advantage in applications such as that described above, the electromechanical system embodying the synchronous motor exhibits an underdamped resonance at a natural frequency which is typically in the range of 2 to 3 Hertz. This is because the mathematical relationship between motor shaft torque and input electrical power is described by a second order (underdamped) differential equation, similar to that relating to quantities associated with a mass supported by a mechanical spring.

The effect of the electromechanical resonance of the synchronous motor is to increase the ratio of synchronous motor electrical input power to dc motor shaft power at the natural frequency of resonance. Whenever the load power profile contains components at the resonant frequency, the electrical supply system is subjected to power swings of greater magnitudes than those which would occur if the synchronous motor were critically damped. The response to a transient is one of a significant overshoot of input electrical power, followed by an oscillation with a finite settling time.

Although the synchronous motor's excitation can be controlled to maintain a largely constant voltage in the power system at points close to the dragline, even small voltage fluctuations at about 2 Hertz at other points in the power system can cause annoying flicker of lamp intensities. If the dragline is fed from a power station of limited capacity, large power oscillations at 2 to 3 Hertz frequency will impose undesirable demands on the equipment and control systems of the power station. It is, therefore, desirable to minimise power oscillations at these frequencies.

Up until this time, the problem of resonant power oscillations has been addressed by increasing the inherent damping factor of the synchronous motor. This has been done by reducing the resistance of the rotor cage windings, which are alternatively referred to as "damping" or "starting" windings. However, an increase in the motor's damping factor results in an increase in the motor starting current, which is in itself a major source of voltage disruption on the power system. This latter constraint has imposed a limit on the damping that can be achieved. Although some Ward Leonard systems feature a "soft-starting" facility for the motor-generator sets, it is still highly desirable to retain the ability to start the synchronous motor directly across the line in emergency conditions when the "soft start" equipment is out of service. Even if critical damping were achieved by means of low resistance rotor cage windings, the response of synchronous motor input power to a sudden change in mechanical load will still exhibit an overshoot corresponding to the accelerating torque required to bring the motor speed back to synchronous speed after the initial speed depression caused by the load. The invention will reduce or eliminate this overshoot by automatically reducing the load torque below the synchronous motor torque at the appropriate time to provide a net accelerating torque for the synchronous motor.

Attempts have been made to reduce the magnitude of the resonant power swings by limiting the rate of change of dc motor current, a feature which can be achieved expediently in the dc control equipment. However, this approach assumes constant dc motor voltage during the change in dc motor current, which is rarely the case. In fact, such a control can be counterproductive when the dc motor is operating in the current-limited mode. Experience has shown that this approach is ineffective as a remedy to the power oscillation problem.

Variable speed dc motor control systems usually control motor speed by regulating the actual motor speed, terminal voltage or counter-electromotive force. Overriding limits are usually imposed on the maximum motor current, this latter limit frequently being a function of motor voltage. The net result is to force the dc motor's voltage and current to lie within a boundary which represents a simplified limit of the commutating ability of the dc motor and generator combinations. Small transient excursions beyond these limits are not harmful and are regarded as acceptable.

At times, the major controlled variable may be motor current or torque with overriding voltage or speed limits, but with similar boundaries as mentioned above.

The invention will now be further described with reference to the accompanying drawings, in which:

FIGS. 9 to 11 are similar to FIG. 4 but show modified forms of control circuitry, in accordance with the invention The system diagrammatically illustrated in FIG. 1 shows a Ward Leonard generator set comprising a synchronous motor 2 coupled to a three phase mains supply 4. The synchronous motor has an output shaft 6 which is mechanically coupled to the shaft 8 of a dc generator 10. The dc generator 10 is electrically coupled to drive a dc motor 12 the output shaft 14 of which is coupled to a mechanical load which is subject to variations.

Figure 1:
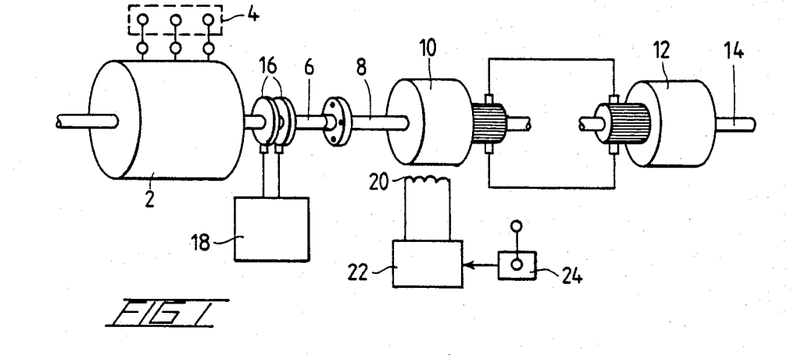
FIG. 1 schematically illustrates a Ward Leonard generator set embodying the invention.

The synchronous motor 2 preferably has slip rings 16 to provide electrical coupling to power factor control circuitry 18. The dc generator 10 includes a winding 20 which is controlled by a dc control circuit 22, the circuit 22 being subject to input controls from a manual controller 24 or from some other sources.

Figure 2A:
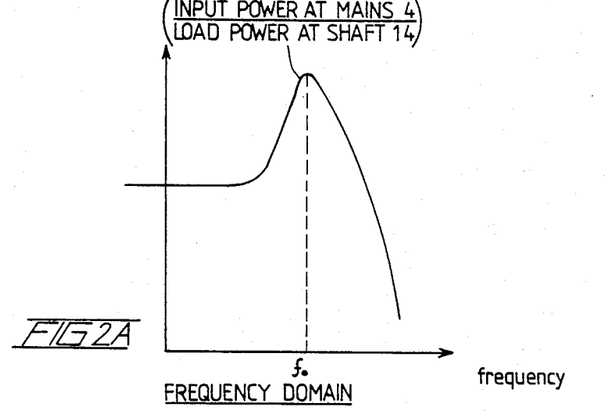
FIG. 2A and 2B show the relationships between the dc motor mechanical power and synchronous motor electrical input power in the frequency domain and time domain for a conventional system.
Figure 2B:
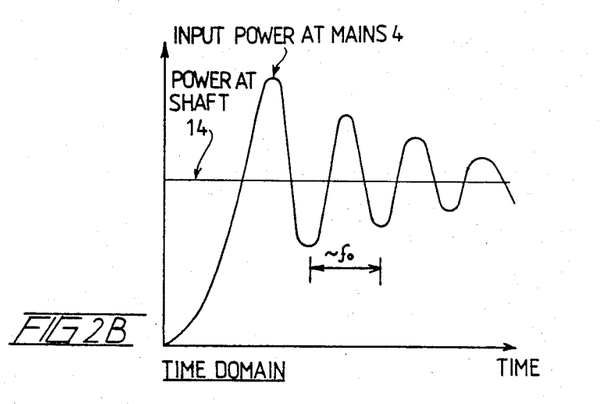

In a conventional system similar to that diagrammatically illustrated in FIG. 1, variations in the mechanical load on the shaft 14 of the dc motor which occur at about the natural frequency of resonance of the synchronous motor 2 cause undesirable variations in the input power supplied to the system from the mains 4. Such variations are diagrammatically shown in FIGS. 2A and 2B. FIG. 2A shows the effect of amplified input electrical power relative to the load power as a function of the frequency of the variation of mechanical loading on the shaft 14, $f_o$ being the frequency of natural resonance of the motor 2. FIG. 2B shows the transient oscillations of input power as a function of time. It will be appreciated that these variations are highly undesirable.

In accordance with the invention novel circuitry is included in the dc control 22 to avoid or substantially reduce the undesirable response characteristics shown in FIGS. 2A and 2B.

Figure 3:
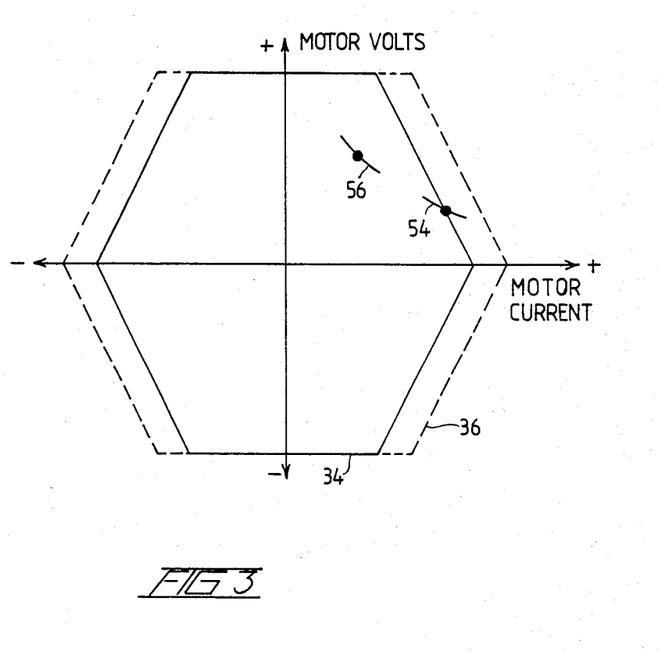
FIG. 3 shows the voltage and current boundaries for a typical dc motor.
Figure 4:
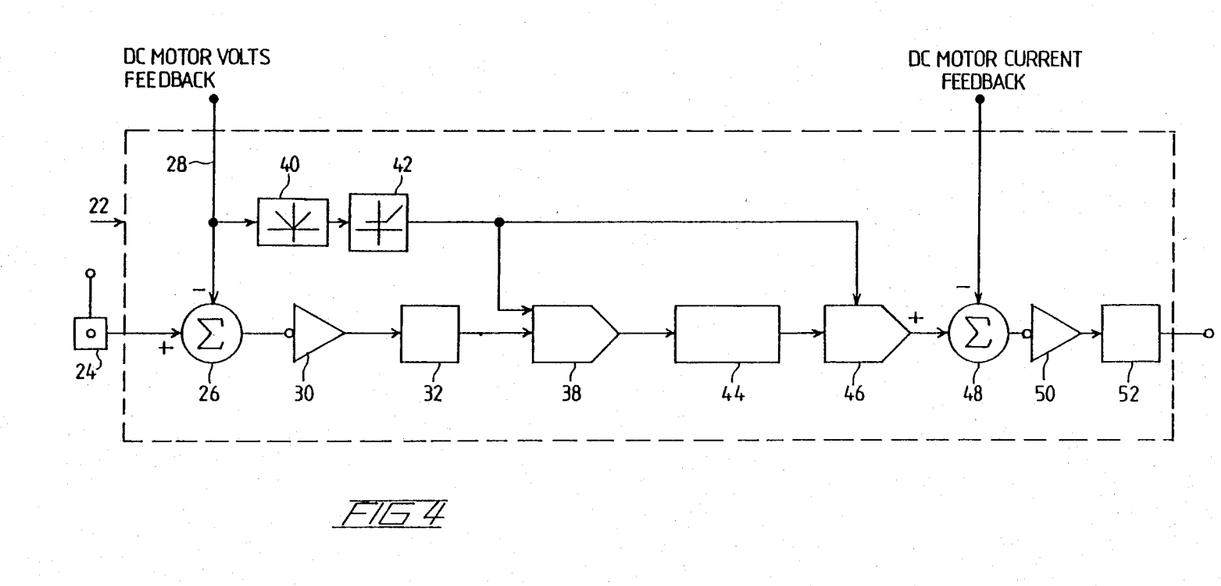
FIG. 4 shows one embodiment of the control circuitry for controlling the field coils of the dc generator in accordance with the invention.
Figure 5:
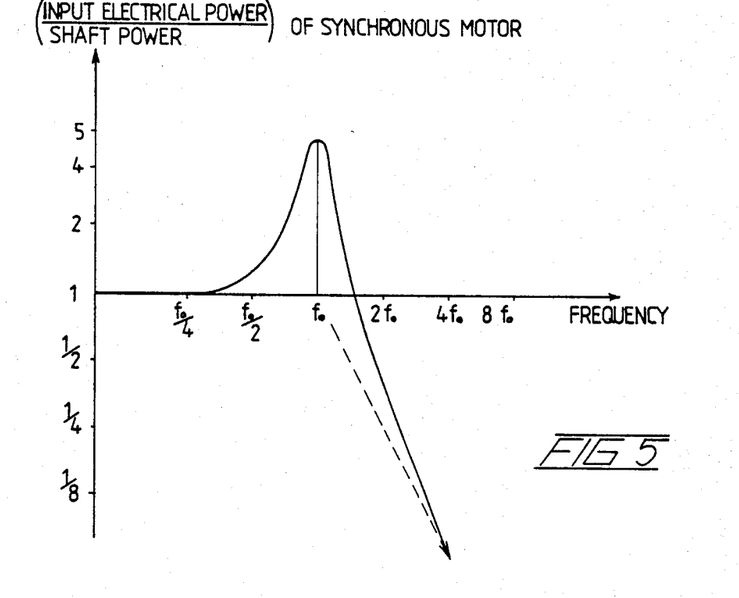
FIG. 5 shows the variation of electrical input power to shaft mechanical power for the synchronous motor as a function of frequency.
Figure 6:
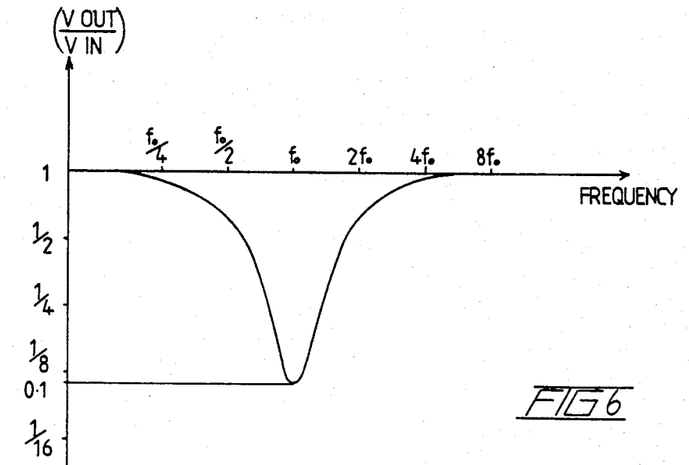
FIG. 6 illustrates the frequency response of the notch filter which forms part of the circuit shown in FIG. 4.

FIG. 4 illustrates schematically a preferred arrangement for the dc control 22. In this arrangement, output from the manual controller 24 is applied to a first input of a summing circuit 26. Output of the manual controller represents the "setpoint" or "reference" value signal for the major controlled variable, which in this case is dc motor voltage. This setpoint signal may be derived from other sources. The other input to the summing circuit is a line 28 which is coupled to the dc motor and has a signal thereon which is related to the voltage of the dc motor 12. The output of the summing circuit 26 is applied to a voltage regulating amplifier 30 the output of which is applied to a current reference limit circuit 32. The circuit 32 has a characteristic which represents the boundaries of the commutating ability of the dc motor and generator combinations. A typical boundary pattern is shown in FIG. 3, where the full line boundary 34 illustrates diagrammatically the steady state limits whereas the broken line boundary 36 shows the transient limits. The output signal from the circuit 32 can be regarded as a current reference magnitude signal suitably limited in order to maintain the actual motor current in the motor 12 within prescribed values. The output is applied to one input of a multiplying circuit 38 the other input of which is derived from the line 28 after passing through limiting circuits 40 and 42 which set the absolute values and minimum limits respectively for the signal representing dc motor voltage. Output from the multiplier 38 can be regarded as a power reference signal which is then applied to the input of a notch filter 44 which is, in accordance with the invention, tuned to compensate for the resonance of the synchronous motor 2. Ideally, the filter has a notch depth of twice the amplification of the synchronous motor at resonance, its notch frequency also matching the resonance frequency of the synchronous motor. A typical frequency response for the filter 44 is shown in FIG. 6 which shows the ratio of the magnitude of the output voltage to the input voltage as a function of frequency, $f_0$ being the resonance frequency of the synchronous motor 2. FIG. 5 shows the ratio of synchronous motor input electrical power to dc motor electrical power as a function of the frequency of mechanical loads applied to the shaft 14 of a conventional Ward Leonard generator set. It will be seen that for a typical conventional system the ratio is about 5 at the resonance frequency. Accordingly, the magnitude of the voltage response of the filter 44 drops from unity to about 0.1 at resonance, as illustrated in FIG. 6.

Output from the notch filter 44 is applied to one input of a dividing circuit 46, the other input being derived from the circuit 42 so that the power signal, now filtered, is effectively converted once again to a current reference signal. Output from the dividing circuit 46 is applied to a summing circuit 48 the other input of which receives a feedback signal derived from the motor current of the dc motor 12. Output from the summing circuit 48 is then applied to a current regulating amplifier 50 which controls a generator field exciter 52. The exciter 52 may comprise a power amplifier connected to the dc generator field windings 20.

The modified current reference signal i.e. the output from the summing circuit 48 gives rise to a dc power response which provides a weighted reciprocal compensation for the power response of the synchronous motor 2. The volt/amp characteristic of the dc motor 12 will follow a transient path which approximates a constant power hyperbola in response to those load torque components which fluctuate at the natural frequency, $f_0$. When operating in current limiting mode, the average volt/amp point will be located on the current limit boundary 34 (see FIG. 3) but transient power excursions at the natural frequency will still follow trajectories which approximate constant power loci. These operating modes are diagrammatically illustrated by the loci 54 and 56 marked on FIG. 3. The transient excursions beyond the steady state current boundaries are acceptable provided that they lie within the motor manufacturer's stated dynamic limits.

The constant power locus 54 represents a smaller excursion of dc motor voltage (and therefore dc motor speed) than does the conventional current limit boundary for the same amplitude of excursion of dc motor torque. This means that the drive speed performance when operating about the current limit boundary is improved on that of the conventional system.

Figure 7:
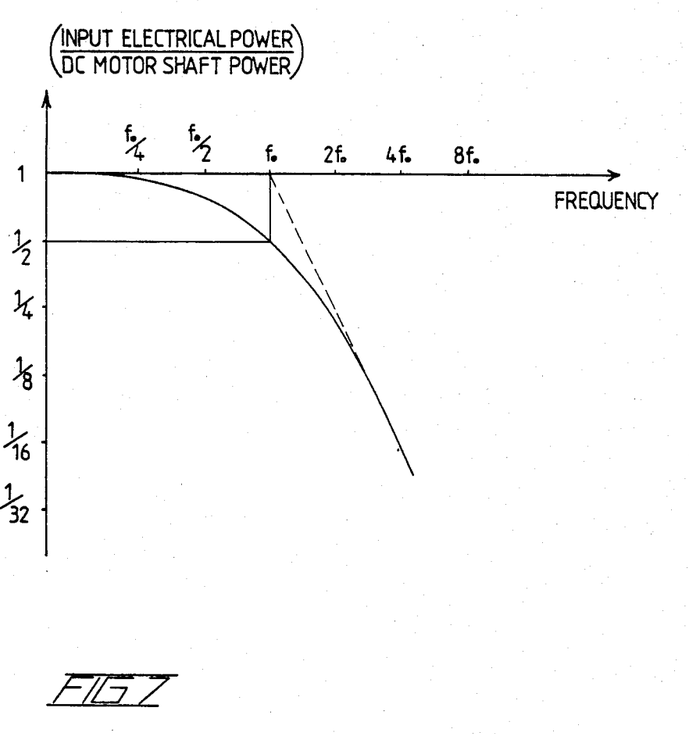
FIG. 7 shows the ratio of synchronous motor electrical power to dc motor mechanical power as a function of frequency in a system embodying the invention.
Figure 8:
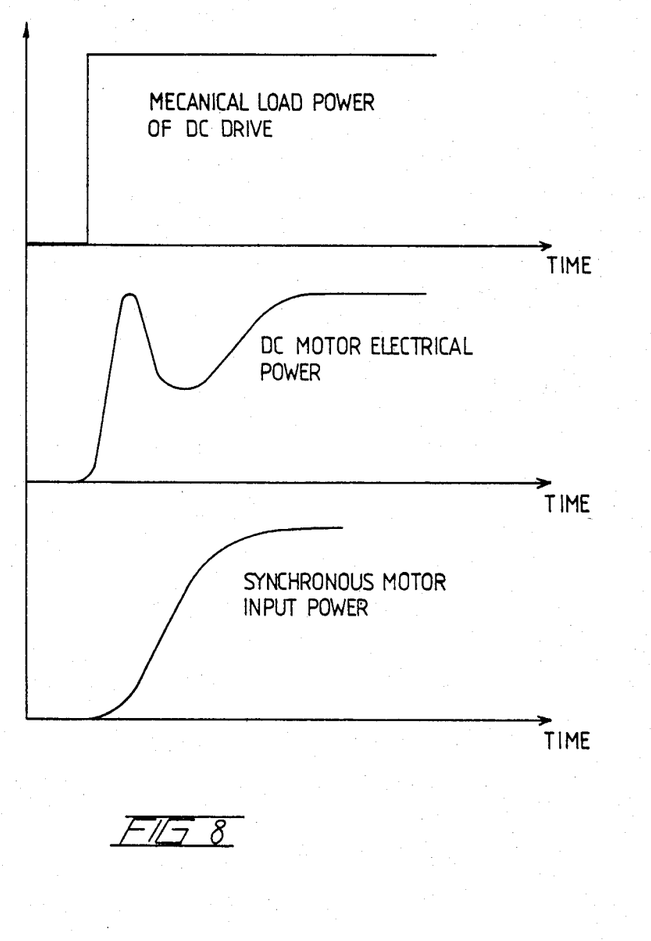
FIG. 8 shows the time response of dc motor electrical power and synchronous motor electrical power as the result of a sudden change in dc motor mechanical torque.

In accordance with the invention, power overshoot and amplification are minimised for all modes of operation of the dc drives, with minimal resultant effect on the response of the drive regulating systems. FIG. 7 illustrates the improved result obtained in accordance with the invention. In particular it shows the ratio of electrical input power to mechanical output power as a function of frequency. It will be seen that the amplification which occurred at resonance in a conventional system as shown by the graph in FIG. 2A has been eliminated without adverse side effects. FIG. 8 shows the ideal time response of input electrical power to the synchronous motor as a result of a sudden change in mechanical load on the dc motor. The overshoot and oscillation shown in FIG. 2B have been eliminated.

The closed loop current regulator embodying the dc current feedback, summing circuit 48, current regulating amplifier 50, generator field exciter 52, generator field 20 and generator 10 should be a high speed armature current regulator typically with a first order response of 8 milliseconds (20 Hertz bandwidth) so that the current in the drive system may be varied at an order of magnitude faster than the resonance frequency of the synchronous motor.

Figure 9:
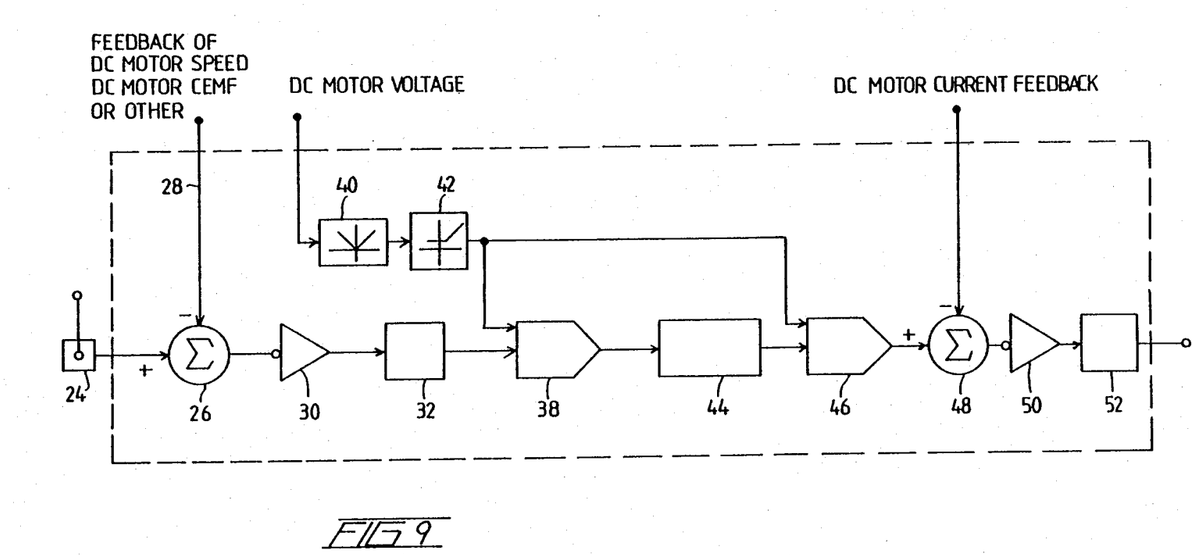
Figure 10:
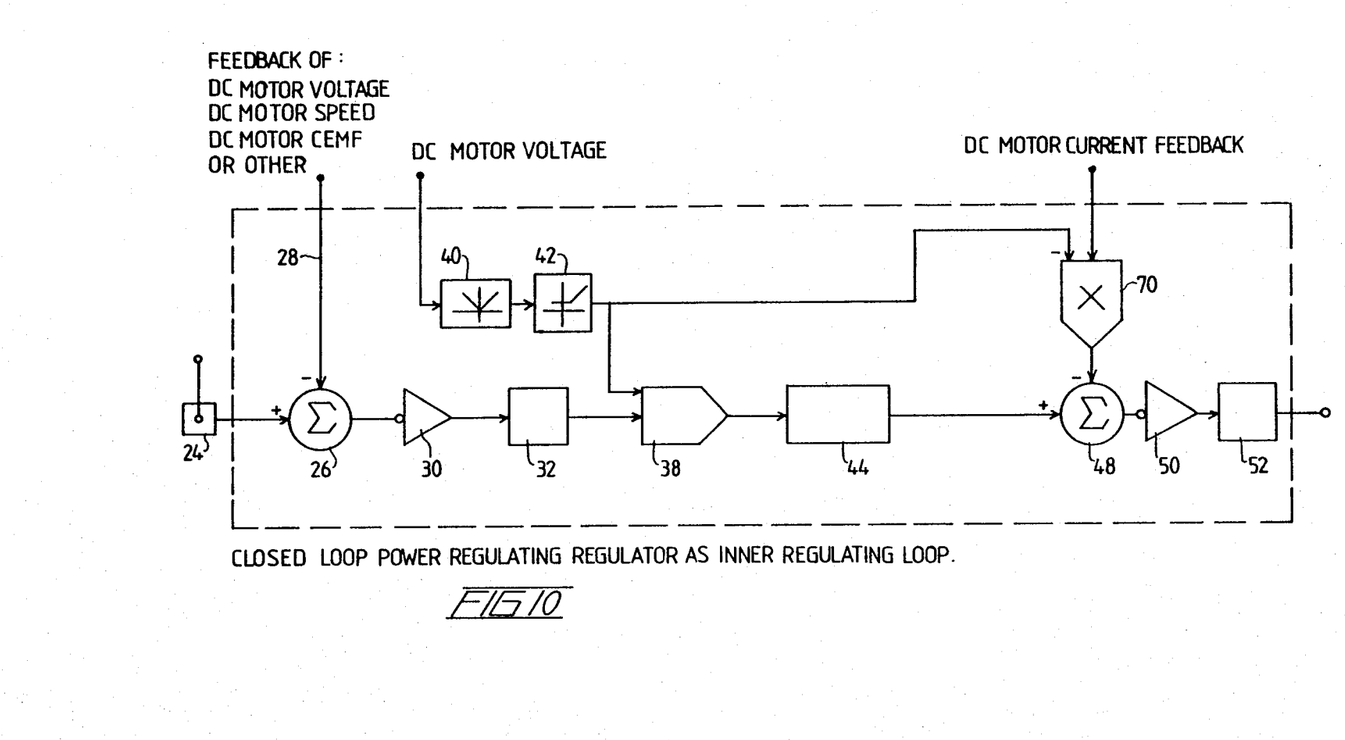

FIG. 9 diagrammatically illustrates some alternatives in which feedback signals are applied to the summing circuit 26, the feedback signals being derived from the speed of the dc motor or of the counter-electromotive-force of the dc motor. Other variations include the following:

1. A closed loop power regulator could be used as the inner regulating loop with a notch filter in the reference path as shown in FIG. 10. In this case the dividing circuit 46 in the current reference circuit is not used. The dc motor power feedback is derived by multiplying dc motor current feedback by a dc motor voltage signal in the multiplying circuit 70.

Figure 11:
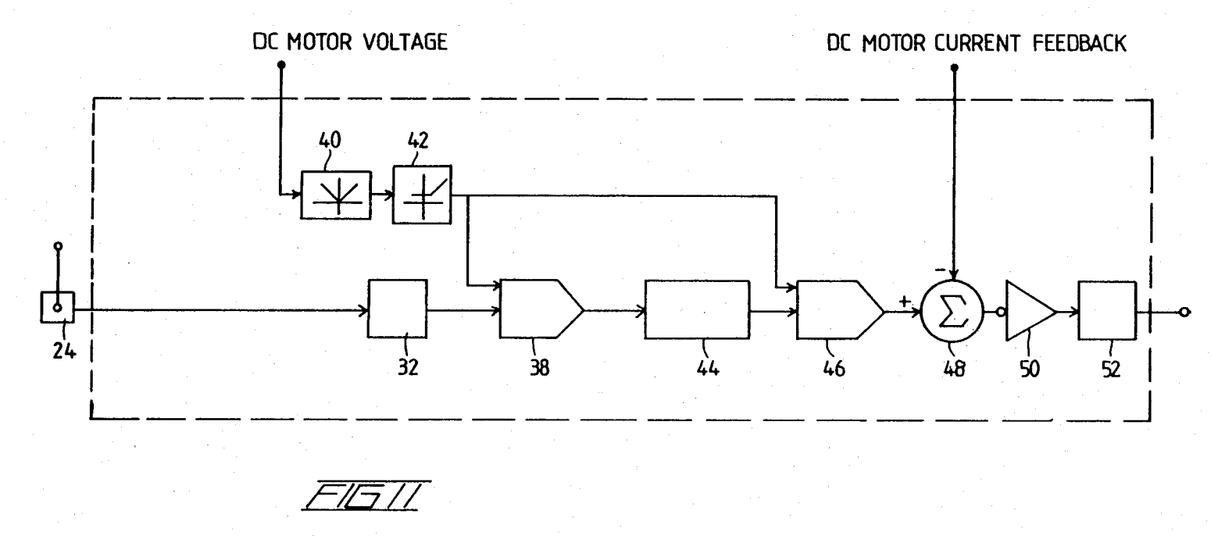

FIG. 11 shows the arrangement of the invention when the dc motor current is the major controlled variable. Where the major controlled variable is DC motor current, the current reference signal is taken from the motor controller, or alternative source, to the current reference limit circuit 32. In this case circuit 32 provides a voltage limiting function more than a current limiting function, but the overall current/voltage boundary is similar to cases where the major controlled variable is DC motor voltage, speed or counter electromotive force.

Many other modifications will be apparent to those skilled in the art without departing from the spirit and scope of the invention.

I claim:

1. A method of reducing the amplitude of oscillations in input electrical power to a drive system, the system including a synchronous motor the output shaft of which is coupled to drive a dc generator which is in turn coupled electrically to a dc motor, the output shaft of which is coupled to a mechanical load, said generator including a generator field exciter, said method including the steps of generating a control signal for controlling said generator field exciter, at least one component of the control signal having been derived from the dc motor and related to its instantaneous power and is passed through a notch filter the frequency response of which generally provides reciprocal compensation for the frequency response of the ratio of input electrical power to the synchronous motor to the mechanical power on its output shaft, and applying the control signal to said exciter to thereby reduce oscillations in input electrical power to the synchronous motor.

2. A method as claimed in claim 1 wherein the frequency response of the filter network has a notch filter depth which is approximately twice the value of amplification at resonance in the frequency response of the synchronous motor.

3. A method as claimed in claim 1 or 2 wherein said one component is derived from voltage feedback signal from the dc motor substracted from a voltage reference signal, amplified, passed through a current reference limit circuit and then applied to one input of a multiplier and wherein said voltage feedback signal is passed through limiting circuits and applied to another input of the multiplier, the output of the multiplier being a power reference signal which is applied to the notch filter and wherein the output of the notch signal is divided by voltage signal at the output of the limiting circuits to form a current reference signal, generating a current feedback signal representative of current in the dc motor, subtracting the current feedback signal from said current reference siganl, amplifying the summed signal and applying the amplified summed signal to said exciter.

4. An electric drive system comprising a synchronous motor for coupling to an ac mains supply, a dc generator coupled to be driven by the output shaft of the synchronous motor and including a field exciter, a dc motor coupled to be electrically driven by the dc generator, the output shaft of the dc motor being coupled in use to a mechanical load, said drive system including control means for controlling power output on said output shaft, said control means including a control circuit for controlling the field exciter of the dc generator, a notch filter the frequency response of which generally provides reciprocal compensation for the frequency response of the ratio of input electrical power to the synchronous motor to the mechanical power on its output shaft, said circuit including means for generating at least one control siganl related to the instantaneous power of the dc motor, said control signal being coupled to the notch filter and the output thereof being coupled to control the field exciter of the dc generator.

5. A drive system as claimed in claim 4 wherein the notch filter has a depth which is approximately twice the value of amplification at resonance in the frequency response of the synchronous motor.

6. A drive system as claimed in claim 4 or 5 wherein the control circuit includes a current reference circuit and a multiplier circuit which has one input coupled to the output of the current reference circuit and another input coupled to a voltage feedback signal derived from the voltage of the dc motor whereby the output of the multiplier circuit is a power reference signal which is coupled to the input of the notch filter.

7. A drive system as claimed in claim 6 wherein the control circuit includes a dividing circuit, the output of the notch filter being connected to one input thereof, the other input being coupled to said voltage feedback signal, whereby the output of the dividing circuit comprises a current reference signal.

8. A drive system as claimed in claim 7 wherein the control circuit includes a summing circuit having one input coupled to the output of the dividing circuit and another input coupled to a current feedback signal derived from the current in said dc motor, the output of the summing circuit being applied to said field exciter via a current regulating amplifier.

9. A drive system as claimed; in claim 6, including a manual controller the output of which is summed with said voltage feedback signal, the summed output being applied to said current reference circuit via a voltage regulating amplifier.

10. A drive system as claimed in claim 6, including a manual controller the output of which is summed with a feedback signal derived from the speed or emf of said dc motor, the summed output being applied to said current reference circuit via a voltage regulating amplifier.

* * * * *